United States Patent [19]

Stelzer

[11] 4,026,269
[45] May 31, 1977

[54] SOLAR HEATING SYSTEMS

[76] Inventor: William Stelzer, 1354 Blue Heron Drive, Milford, Mich. 48042

[22] Filed: Sept. 22, 1975

[21] Appl. No.: 615,430

[52] U.S. Cl. .............................. 126/270; 237/1 A; 237/8 R; 126/271

[51] Int. Cl.² ........................................ F24J 3/02

[58] Field of Search ................. 126/270, 271, 400; 237/1 A, 8 R; 236/72, 90, 101 R

[56] References Cited

UNITED STATES PATENTS

| | | | |
|---|---|---|---|
| 1,661,473 | 3/1928 | Goddard et al. | 126/271 |
| 1,696,003 | 12/1928 | Harvey | 126/271 |
| 2,122,821 | 7/1938 | Mohr | 126/271 |
| 2,595,905 | 5/1952 | Telkes | 126/270 |
| 2,712,772 | 7/1955 | Trombe | 126/270 |
| 3,107,052 | 10/1963 | Garrison | 126/271 |
| 3,171,403 | 3/1965 | Drescher | 126/270 |
| 3,178,113 | 4/1965 | Curry et al. | 126/270 |
| 3,372,871 | 3/1968 | Pfluger | 237/8 R |
| 3,847,136 | 11/1974 | Salvail | 126/271 |
| 3,915,147 | 10/1975 | Rineer | 126/271 |

Primary Examiner—John J. Camby
Assistant Examiner—Henry C. Yuen

[57] ABSTRACT

A solar heating system for converting the sun's rays into heat, comprising a level heat absorbtive element whose underside is adapted to absorb solar radiation and to convert it into heat, the absorbtive element being provided with means to conduct the absorbed heat away to be used for heating, reflector means arranged below said heat absorbtive element adjustably positioned to project solar heat rays onto said absorbtive element, the reflector means being movable into an inoperative protected position when not in use, the heat absorbtive element being protected against heavy loss by an insulated housing trapping dead air underneath said heat absorbtive element and being adapted to allow heat radiation to pass from said reflector means to said heat absorbtive element.

1 Claim, 6 Drawing Figures

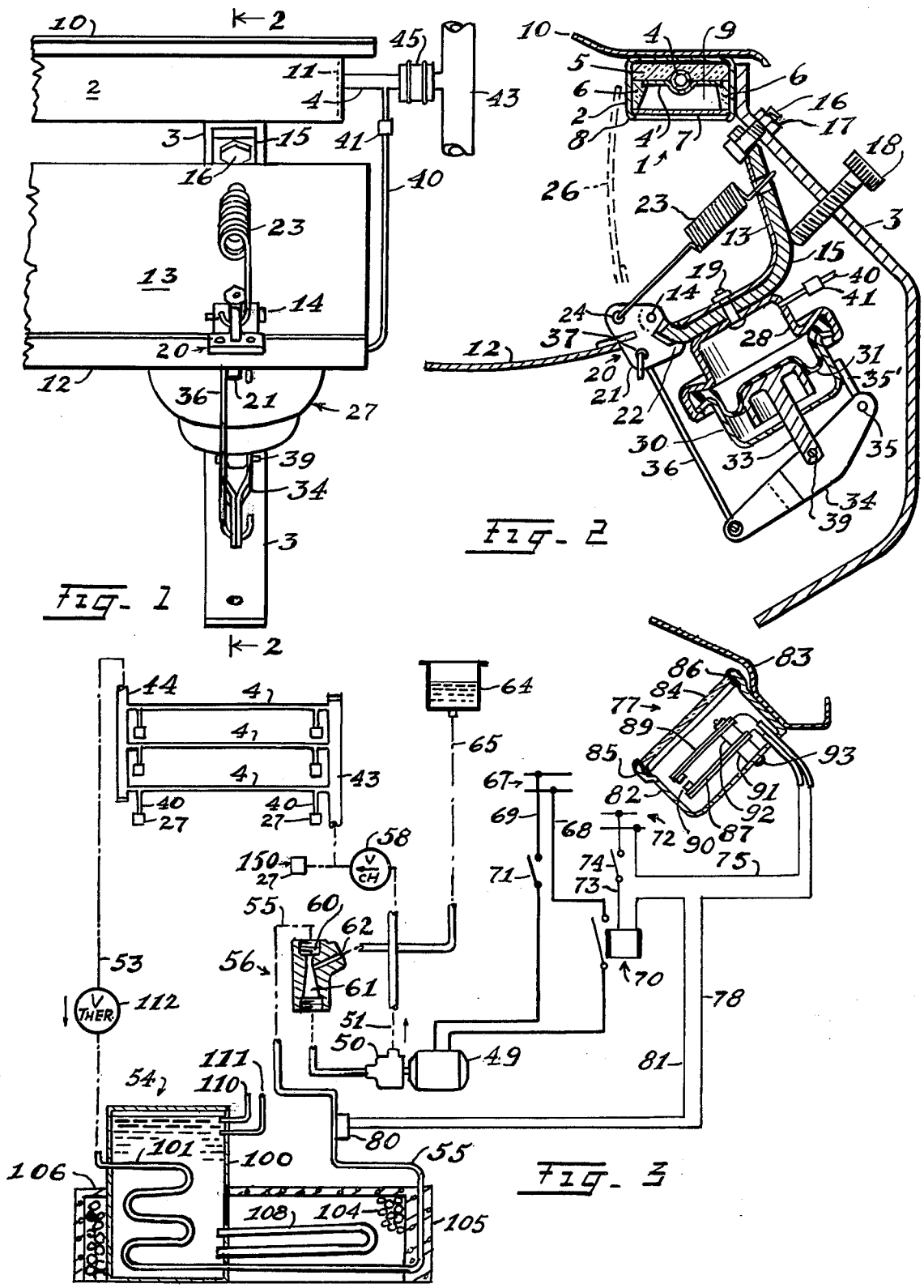

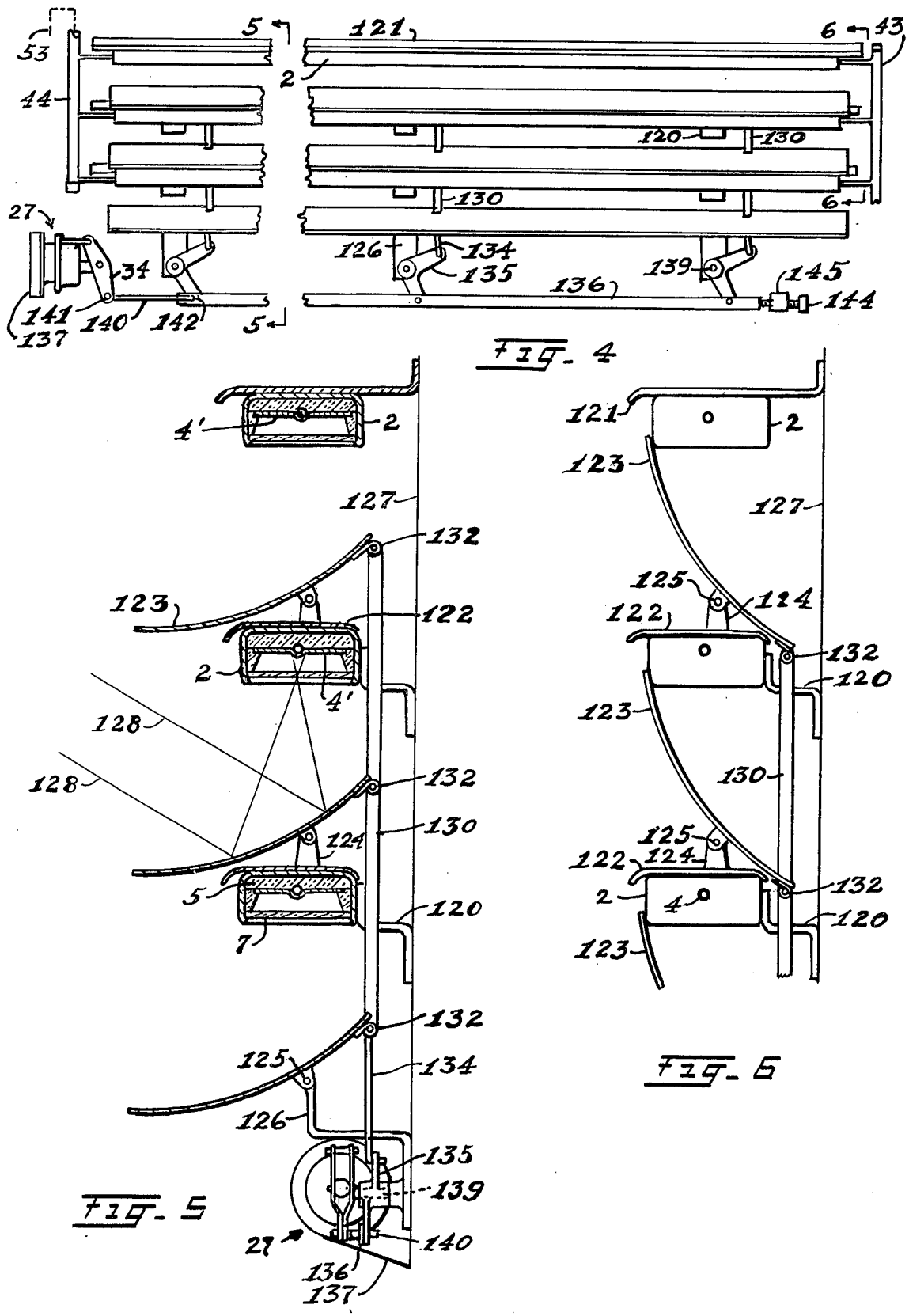

SOLAR HEATING SYSTEMS

The invention relates to solar heating systems for converting the sun's rays into heat. In present solar heating systems using vertical or slanted panels having a blackened heat absorbing surface covered by a sheet of glass the air between the black surface and the glass is heated up causing considerable heat loss through convection. Also the glass may heat up so much that breakage is possible, necessitating the use of special heat resistant glass or insulating glass so that the cost of a panel is greatly increased while still having a low efficiency due to the inevitable heat loss caused by convection.

The object of the present invention is to reduce the loss of heat by using a horizontal level heat absorbtive surface, a glass pane below the heat absorbtive surface and a layer of dead air between the surface and the glass pane to serve as an insulator. Though the top layer of air next to the black surface is heated up, being lighter it remains stationary and the lower part of the layer of air remains relatively cool. Thus the excellent insulating qualities of air are used to advantage to obtain maximum efficiency.

Another object is to arrange the glass as described so that it is not subject to overheating, making it unnecessary to use heat resistant or insulating glass.

A further object is to provide reflecting surfaces to concentrate the sun's rays on a smaller area so that a higher temperature may be obtained and the amount of glass and tubing for carrying the heat away may be reduced.

A further object is to make the reflectors adjustable for different angles of incidence of the sun's rays and to move them automatically into an inoperative position when there is not sufficient sun, to be protected from inclement weather.

The invention also aims at providing the means for turning the heat off when the operation of the system is not desired, to prevent overheating.

Other objects and advantages of the present invention will become more apparent from the following detailed description taken in conjunction with the drawings, in which:

FIG. 1 is a fragmentary front elevation of a solar heat converter incorporating the invention;

FIG. 2, a section taken on lines 2—2 of FIG. 1;

FIG. 3, a diagram of the solar heating system with the elements shown schematically;

FIG. 4, a front elevation of a modified form of the invention, part of the construction being broken off in order not to encumber the drawing;

FIG. 5, a section taken on lines 5—5 of FIG. 4; and

FIG. 6, a fragmentary section taken on lines 6—6 of FIG. 5 showing the reflectors in the released or inoperative position.

Referring now to the drawing and particularly to FIGS. 1 and 2, a solar converter unit 1 comprises an inverted horizontal channel or housing 2 extending east and west rigidly secured to brackets 3 which in turn may be fastened to the roof or the sides of a building or to a frame. The lower sloping portion of the brackets lends itself for mounting on a roof. The channel 2 houses a metal tubing 4 which may be round, oval, or flat and welded to or held in contact with a horizontally level elongated heat absorbtive element in the form of a sheet metal plate 4' whose underside is blackened with a desirable coating to obtain maximum absorbtivity and minimum emissivity. The tube 4 and plate 4' are insulated against heat loss by an insulating member 5 and lateral insulating members 6, the latter being retained by a pane of glass 7 held by overturned edges 8 of the channel. The inside faces of insulating members 6 are light reflective so as to reflect any heat radiation onto plate 4' and not to absorb any heat. The space between glass pane 7 and plate 4' trapping the insulating air is indicated by numeral 9. The transparent pane 7 is preferably made of glass to reduce the loss of heat through the emission of infrared rays from the heat absorbing surface of plate 4' while letting in the short wave heat from the sun. A shield 10 is secured on top of channel 2 and serves as a protection against snow or rain. It is vital that the channel, plate 4', and glass pane 7 are horizontally level and at right angle to the force of gravity to prevent any circulation of air in space 9 and consequent loss of heat through convection. Space 9 is totally closed, the channel having end walls 11 as a part of it. A pair of solar reflectors 12 and 13 hinged together on a longitudinal axis at 14 are arranged below channel 2 to reflect and concentrate the sun's rays onto the blackened surface of plate 4'. As seen in the cross-section the reflecting surfaces are curved as part of a parabola which in the short segment is practically the same as the curvature of a circle. The reflectors 12 and 13 may be made of sheet metal and should have a mirrorlike surface; they should be as long as it is practicable to minimize the loss of radiation at the ends when the sun is east or west. Reflector 13 has reinforcing bars 15 conforming to it, each pivoted at its upper end to a bracket 3 by a bolt 16 threaded into bracket 3 and locked by a lock nut 17 but allowing play for reinforcing bar 15 so that it can pivot. The reflector may have a plurality of such reinforcing bars, at least one at each end and possibly one or more in between depending on the length of the reflector. An adjusting screw 18 threaded into each bracket 3 adjustably holds reflector 13 in the desired position so that the sun's rays are focused on plate 4'. The lower extemety of bar 15 is adapted to serve as part of a hinge pivotable on axis 14 and cooperating with the hinge member 20 to which the reflector 12 is riveted or otherwise secured. The hinge member 20 has a lug 21 extending downwardly and abutting bar 15 at 22 whereby the two reflectors are properly lined up in the operating position, as shown. A spring 23 connected to bar 15 and engaging hinge member 20 through a hole 24 tends to pull reflector 12 upwardly swinging about pivotal axis 14 into a position indicated by dotted lines 26 to come to rest against channel 2. In the operating position the spring 23 is overcome by the force of a fluid pressure motor mechanism indicated generally by numeral 27. This motor mechanism comprises an upper shell 28 secured to bar 15, as with a bolt or rivet 19, and a lower shell or cover 30 with a flexible diaphragm 31 interposed. The outer bead of the diaphragm is sealingly clamped between the two shells and engages a piston 33 pivotally connected to a lever 34 at 39 which has a fixed pivotal support at 35 by means of a bracket 35' rigidly secured to shell 30, as by welding. The other extremety of lever 34 is engaged by a wire link 36 whose upper end is hooked into a hole 37 of hinge member 20. The upper shell 28 has a pipe connection 40 (shown out of position in FIG. 2) connected to tubing 4 where 41 indicates a pipe coupling. The connector 40 has sufficient flexibility to allow adjustment of reflector 13 when the entire reflector and motor mechanism assembly swings a short angular distance on bolt 16. It is apparent that a number of solar heating units may be used in one system, thus the manifolds 43 and 44 serve to connect a plurality of solar units in parallel, the connection between the manifolds and the tubes 4 being facilitated by flexible couplings 45, as shown in FIG. 1. In the embodiment shown the cross-sectional view in FIG. 2 is typical at each bracket 3.

Referring now to the diagram in FIG. 3, the embodiment by way of example assumes the use of hydraulic fluid such as water with anti-freeze solution and rust inhibitor for transmitting the heat energy. For this purpose a centrifugal pump 50 driven by an electric motor 49 is arranged to pump fluid through pipe 51 to tubes 4 via inlet manifold 43 and out through outlet manifold 44 and pipe 53 to a heat sink 54 for storing thermal energy from where the fluid is returned through pipe 55 to the inlet side of pump 50 to complete the closed circuit. A jet operated pressure amplifier 56 is interposed in line 55. Line 51 has a check valve 58, the latter being of the residual spring biased type to provide enough resistance to prevent a thermosyphon flow when the system is not in operation. The pressure amplifier 56 has a narrowing inlet 60 to change pressure into velocity and a venturi type outlet 61 to change velocity back into pressure. A suction inlet passage 62 at the narrow portion of the venturi 61 is connected to a reservoir 64 by a pipe 65. The electrical circuit for energizing the electric motor 49 is connected to an electric line 67 where two wires 68 and 69 lead to motor 49 with a relay 70 and manual switch 71 interposed. The relay 70 is energized from a low voltage line 72 where one wire 73 leads to relay 70 with a manual switch 74 interposed, and a second wire 75 leads to a solar thermostatic switch 77 which controls the energization of relay 70 through wire 78, a thermostatic switch 80 and wire 81. The solar thermostatic switch comprises a housing 82 with an attached mounting bracket and shield 83 and a glass window 84 secured in a recess 85 of the housing as with sealing compound at 86. Within the housing are two spaced bi-metallic elements 87 and 89 provided with electric contact points 90 and secured to the housing with electric insulating spacers 91 and 92 by means of insulated bolts or rivets 93. Wire 75 leads to element 87 and wire 78 to element 89. In both elements the metal having the higher coefficient of expansion is on the upper side facing the window 84. Both are similar except that element 87 which is closest to the window 84 has a blackened surface so that the solar rays falling on the blackened surface heat up the element 89 while the other element 87 remains at ambient temperature because it is shielded from the sun and has no blackened surface. The purpose of this arrangement is to make the switch 77 truly responsive to the solar heat rays and to be independent of the ambient temperature. When the ambient temperature increases both elements bend in the same direction maintaining the gap between the contact points unless solar radiation with sufficient intensity falls on element 89 to cause deflection of the latter to close the contacts. The thermostatic switch 80 is normally closed. It is mounted adjacent pipe 55 and opens only when there is overheating of pipe 55, as for instance when the heat sink is heated up to the maximum desired temperature. The heat sink 54 in the example shown comprises a water tank 100 provided with a heating coil 101 connecting line 53 to line 55. The lower part of the water tank extends into a gravel bed 104 contained by an insulated enclosure having sides 105 and top 106, which may serve as foundations or structural parts of a building. A plurality of large pipes 108 in the lower part of the gravel bed are connected to the lower end of tank 100 in such a manner that thermo-syphonic flow of water from the tank heats up the gravel bed 104. With this arrangement different zones of temperature are established, the upper part of tank 100 being the hottest and the lower part of tank 100 and of the gravel bed 104 having a lower temperature. The hot water in the upper part of tank 100 may be circulated in a conventional manner as it is done in present hot water heating systems for heating the building as with pipes 110 and 111. It is desirable that enclosures 105, 106, and the part of tank 100 extending above the latter be insulated to have better control of the heat storage and of heating the building for which the system is designed. In order to adjust the rate of flow through the hydraulic pipes to the time required to heat the fluid in tubes 4, I interpose a thermostatic valve 112 in line 53. This is a conventional valve which is responsive to the temperature of the fluid passing through pipe 53 so that with a high temperature the valve is wide open to permit maximum flow and with lower temperatures the flow becomes more restricted, but it is never entirely closed. It is desirable that the pipes, including manifolds 43 and 44, between the solar heat collectors and the heat sink be insulated against heat loss, though the insulation is omitted in the drawing.

The modified construction shown in FIGS. 4, 5, and 6 is adapted specially for wall mounting and is best suited for northern climates where the sun is low in the winter and there may be heavy snow fall. The channels housing the heat absorbtive plate are similar to the one shown in FIGS. 1 and 2 and thus carry the same numerals. They are mounted one above the other to the south side of a building or wall by means of brackets 120 and 121, the latter serving as a shield for the topmost channel against rain or snow. The lower channels have shields 122 for the same purpose, particularly when the reflectors are in the retracted position as shown in FIG. 6. The reflectors 123 are pivotally supported by supports 124 extending upwardly from shields 122 or channels 2 to rotate about pivot pin 125. The lowermost reflector is pivoted directly to brackets 126, which are like brackets 120 secured to the wall, numeral 127 indicating a line marking the outside surface. The reflectors have a paraboloid curvature as seen in the cross-section so that sun rays are focused onto the heat absorbtive plate 4', lines 128 indicating the projection of such rays. The reflectors 123 are connected together by connecting links 130 engaging hinge joints 132 secured to reflectors 123. The lower ends of links 130 are engaged by push rods 134 at the hinge joints 132 of the reflector so that the reflectors rock in unison when push rods 130 are actuated by a fluid pressure motor mechanism 27 working through a number of bell cranks link 136. The motor mechanism is mounted to the face 127 of the building by a bracket 137 and is of the same construction as shown in FIG. 2. The bell cranks 135 are rotatably supported by studs 139 extending from brackets 126. One arm of each bell crank is connected to cross link 136 and other to push rods 134. A rod 140 connected to the lower end of lever 34 at 141 also engages one end of the cross link 136 at 142 so that all bell cranks, connecting links, and reflectors move in unison when actuated by the motor mechanism 27. The position of the reflectors may be adjusted by an adjusting screw 144 in a threaded bracket 145 secured to the wall of the building, acting as a stop for rod 136. The reflectors are urged into the inoperative protected position shown in FIG. 6 by the weight of links 130 which may be made heavy enough to supply the necessary force after the fluid pressure motor mechanism is deenergized.

The operation of the sytem is intermittent. When the sun is not shining the solar converter is in a closed position where reflector 12 of the construction shown in FIGS. 1 and 2 is tilted upwardly as indicated by dotted lines 26 so that the mirror surfaces are protected from the weather. Motor 49 is at rest and no fluid is being circulated. Assuming now the sun is shining on solar thermostatic switch 77, the sun's rays heat up the black surface of bi-metallic member 89, causing contacts 90 to close, and assuming that the manual switch 74 is closed, the control circuit energizing relay 70 is closed, which in turn closes the electric power circuit to start motor 49 and pump 50. The latter pumps water through the closed pipe circuit and generates a certain hydraulic pressure which is also transmitted to motor mechanisms 27 through the small tubings 40 acting on diaphragms 31 as shown in FIG. 2. Piston 33 is pushed downwardly to swing lever 34 about pivot 35 to actuate hinge member 20 through connecting link 36 to pull reflector 12 downwardly, swinging about pivot 14 into the position shown where the sun's rays are received and projected onto the heat absorbtive plate 4'. The latter heats up and transmit the heat to the water in the tube 4. The position of the reflectors may be manually adjusted with screw 18. The width of the heat absorbtive plate 4' permits the focus to be off to some extent, so that an adjustment needs be made only a few times per year. At the start of the operation, when the heat transfer fluid is still cold, valve 112 has the maximum restriction so that the flow of fluid is very slow and the hydraulic pressure in pipes 51 and 53 is high, thus furnishing ample power for the movement of the motor mechanism 27 as described. After the fluid heats up passing slowly through tubes 4 the thermostatic valve 112 opens up more and allows a faster flow as long as the water passing through it has a sufficient temperature. The faster flow reduces the heat generated by pump 50 but the jet action past inlet 62 of the pressure amplifier draws fluid from reservoir 64 and thereby boosts the hydraulic pressure in the entire closed circuit providing sufficient pressure above atmospheric pressures for the expansible motor mechanism 27 to hold reflector 12 in the operating position. It should be noted that the boost in pressure does not make more work for pump 50. When the solar radiation drops below a certain predetermined intensity, the bi-metal element 89 moves out of contact to break the control circuit, whereby motor 49, and pump 50 are stopped and the head of the pump is reduced to zero. Residual pressure above atmospheric is relieved through passage 62 and reservoir 64. Relieving the hydraulic pressure in the motor mechanism 27 allows reflector 12 to be returned to the inoperative folded position by force of springs 23.

The operation of the modified construction shown in FIGS. 4, 5, and 6 is similar to that described, except that instead of a plurality of fluid pressure motor mechanisms 27 only a single unit is used and linkage is supplied so that all reflectors are forced to move together. Thus the diagram shown in FIG. 3 also applies to the modified construction shown in FIGS. 4, 5, and 6 with the exception that instead of the plurality of motor mechanisms 27 there is only a single motor mechanism indicated by numeral 150. In FIG. 4 this single motor mechanism is shown in the energized position where the reflectors 123 are in a position to reflect the sun's rays when they are at the lowest angle as illustrated in FIG. 5. The angle varies to some degree during the hours in which the solar heating system is in operation; however, due to the width of the heat absorbtive plate 4' and window 7 considerable variation can be tolerated. If it is desired to narrow the heat absorbtive element in relation to the width of the reflectors 123, the structure shown in FIGS. 4 and 5 lends itself readily to the application of a solar tracking mechanism because of the single actuating mechanism and single adjusting device to which the tracking mechanism can be applied. Such tracking mechanisms are known to the art and it would serve no purpose to include such detail in the present disclosure. While three reflectors 123 and heat absorbers are shown in FIGS. 4 and 5, it is apparent that any number or only a single unit could be used.

The embodiments shown are calculated to fulfill the objects above stated, but it will be appreciated that the invention is susceptible to modification, variation and change without departing from the scope or fair meaning of the invention.

I claim:

1. A solar heating system for converting solar radiation into heat, comprising an elongated horizontally disposed level heat absorbtive element extending east and west having a horizontally level underside at right angle to the force of gravity, said underside being adapted for good solar radiation absorbitvity, a horizontally level transparent pane underneath said heat absorbtive element, a space between said underside and said pane to contain a level layer of dead air, an insulating housing to cover said heat absorbtive element and having side walls supporting said transparent pane and confining said layer of dead air, reflector means having a reflective surface below said heat absorbtive element and said pane arranged at such angle as to receive solar radiation and to reflect it through said pane to said underside of said heat absorbtive element to convert said radiation into heat, said reflector means (and) being movable and adjustable by adjusting means to focus the solar radiation reflected by said reflector means onto said horizontally disposed heat absortive element when in the operative position, (and) means to controllably render said reflector means ineffective by tilting said reflector means towards said housing so that said reflecture surface and said heat absorbtive element are not exposed to the sun and are shielded from adverse weather by said housing, and means to conduct the heat absorbed by said element away to be used.

* * * * *